United States Patent

[11] 3,607,169

| [72] | Inventor | Edwin F. Coxe<br>Marietta, Ga. |
|---|---|---|
| [21] | Appl. No. | 774,181 |
| [22] | Filed | Nov. 7, 1968 |
| [45] | Patented | Sept. 21, 1971 |
| [73] | Assignee | Esso Research and Engineering Company |

[54] METHOD FOR PRODUCING EVACUATED GLASS MICROSPHERES
3 Claims, No Drawings

[52] U.S. Cl.................................................. 65/21,
65/22, 106/40 V, 161/DIG. 5
[51] Int. Cl......................................................... C03b 19/08,
C03b 19/10
[50] Field of Search............................................ 65/18, 21,
22; 106/40, 40 V; 264/4; 161/DIG. 5

[56] References Cited
UNITED STATES PATENTS

| 948,541 | 2/1910 | Coleman .................... | 65/22 X |
| 2,012,617 | 8/1935 | Munters ...................... | 65/22 X |
| 3,310,612 | 3/1967 | Somerville................... | 264/4 |
| 3,365,315 | 1/1968 | Beck et al. .................. | 65/22 |

*Primary Examiner*—S. Leon Bashore
*Assistant Examiner*—Robert L. Lindsay, Jr.
*Attorneys*—Manahan and Wright and Donald F. Wohlers ABSTRACT: A method is provided for the production of low density, internally coated, evacuated microspheres wherein the sphere density is uniform and the sphere diameter and wall thickness can be controlled accurately. In a preferred embodiment of the instant method, molten glass (or other suitable nonmetallic material) is used to encapsulate zinc or another suitable metal in either the solid or liquid state. After the metal has been encapsulated the temperature of the particle is increased until the encapsulated metal vaporizes and blows the particles into thin-walled, hollow spheres which are then quenched so that the encapsulating walls become rigid before the condensing metal vapor on the inside of the walls causes the spheres to collapse.

METHOD FOR PRODUCING EVACUATED GLASS MICROSPHERES

BACKGROUND OF THE INVENTION

This invention relates to the production of internally coated hollow particles. More particularly, the invention relates to a process for the continuous production of internally metal-coated and evacuated hollow spheres and to the spheres so produced.

Thin-walled, hollow particles have been prepared in the past for a number of uses by various processes. For example, in U.S. Pat. No. 2,797,201, a method is disclosed for producing hollow spheres from a variety of film-forming materials by subdividing a liquid comprising a film-forming material and a latent gas material dissolved in a suitable solvent into fine droplets and then subjecting the droplets to a drying temperature at which the solvent is evaporated and the latent gas material is converted into a gas coincident with the formation of an outer skin of the film-forming material and to the evaporation of the solvent. The process of the instant invention is distinguished from the process of U.S. Pat. No. 2,797,201, in that a solvent is not employed and the evaporation of the same is avoided.

Another prior art process disclosed in U.S. Pat. No. 3,186,812 provides for the formation of hollow glass articles by heating a pair of glass sheets between a pair of hemispherical concave die members, thereby sealing the sheets together along a circular path while entrapping air in the circular area. The instant invention does not employ sheet material nor do the particles produced contain entrapped air.

Unfortunately, prior art processes such as the above and others do not afford methods for producing internally coated spheres of the size, quality and quantity required to meet the demands for such products.

A primary object of this invention therefore is to provide a new and improved process for the continuous production of uniform, internally coated, hollow spheres in which the enclosed sphere is under a high vacuum.

Yet another object of this invention is to provide a hole-free hollow sphere having a continuous coating on its inner surface.

Still another object of this invention is to provide an evacuated and hole-free hollow sphere of a nonconductive material having a continuous metal coating on its inner surface for use as insulation material.

These as well as additional objects may be accomplished in accordance with the teachings of the instant invention.

SUMMARY OF THE INVENTION

In a preferred embodiment of the instant invention, molten glass is used as the encapsulating medium and zinc or some other metal in either a solid, liquid, or gaseous state is encapsulated within the glass. The metal being encapsulated has a boiling point below the softening point of the glass being used and has, of course, a very low vapor pressure at room temperature. The initial phase of the process, i.e. the encapsulation, per se, may be accomplished by use of suitable prior art processes such as the types discussed hereinafter. While employment of one of these processes would yield particles wherein the solid or liquid metal would be coated or encapsulated with the glass material, these particles would be solid in nature and would not be suitable for use as an insulation material.

Thus, according to the teachings of the instant invention, after the particles are encapsulated, they are "blown" to a larger diameter by increasing the temperature of the particles until the encapsulated metal is vaporized. The expanding metal vapors blow the glass into a thin-walled, hollow sphere which, when fully blown, is quenched such that the glass becomes rigid before the condensing metal vapor on the inside of the walls causes the sphere to collapse. In a preferred embodiment this is readily accomplished by suspending the glass-coated metal particles in a hot airstream.

It is to be understood that both the foregoing general description of the instant invention and the following detailed description are exemplary and explanatory in nature only and are not restrictive of the invention. Reference will now be made in detail to a preferred embodiment of the instant invention.

In accordance with the instant invention, glass-coated metal particles are made by a suitable extrusion method, which method accurately controls the quantity of encapsulating material and the material being encapsulated in each particle. Suitable processes include two methods developed by the Southwest Research Institute and may be classified as extrusion methods of producing microencapsulated particles. These processes are described in an article appearing in the Dec. 4, 1967, edition of "Chemical Engineering" at pages 177–178 and form the subject matter of U.S. Pat. No. 3,310,612. The first of these processes employs a centrifugal extrusion device consisting of a rotating head with nozzles on the periphery. The material to be encapsulated is pumped into an inner chamber within the rotating head and flows through tubes that project into orifices at the periphery of the head. The encapsulating material is pumped through the head and flows through the annuli formed by the orifices and the tubes through which the encapsulated material flows. The result in effect is the extrusion of fluid particles wherein the encapsulating material envelops the material to be encapsulated. These particles subsequently break into individual capsules that are hardened by chemical reactions, evaporation, cooling or other means.

The other Southwest Research Institute process encapsulates materials with an extrusion nozzle device which has two concentric tubes mounted axially in a tubular duct. The material to be encapsulated is pumped through the center tube and the encapsulating formulation is pumped through the annulus of the nozzle so as to extrude a coated rod, which then again breaks into individual capsules that are carried away in a stream of nonreactive carrier fluid. High production rates and accuracy of control are claimed for both of the above processes.

Other processes and apparatus which might be employed in the first step in practicing the invention are discussed in U.S. Pat. No. 3,015,128 and U.S. Pat. No. 2,766,478. It is to be appreciated that the above processes yield only glass-coated metallic particles and not the hollow metal-lined microspheres which the instant invention is directed to.

Thus, according to the improved and novel method of this invention, the glass-coated metallic particles produced by utilizing one of the above-described techniques are further processed by increasing their temperature until the encapsulated material is vaporized. Since the metals used have boiling points below the softening point of the glass which encapsulates them, a buildup in pressure is experienced within each of the glass-coated particles. As the temperature of the particles is increased, the glass coating begins to soften and is expanded into a hollow spherical configuration under the influence of the metal vapor pressure. When the glass spheres are fully blown, they are immediately quenched so that the glass walls of the spheres become rigid. At the same time the reduction in temperature causes the metal vapor to condense on the interior surfaces of the spheres.

It will be further appreciated that the interior of the individual spheres are highly evacuated as a result of the above condensation. In the case where zinc is the metal used, the pressure inside the microspheres would be on the order of $10^{16}$ Torr or less (this is consistent with the vapor pressure of zinc at ambient temperatures). Furthermore, the condensation also results in having a silvered, low emissivity surface on the inside of each microsphere.

In accordance with this invention, cooling to achieve the above-described condensation may be effectively accomplished by quenching the blown spheres with an inert gas. Exemplary of inert gases that can be used are argon, helium, neon, nitrogen, and the like.

It will be appreciated by those skilled in the art that any-size bubble or microsphere can be produced by the process of the instant invention and that the size will depend on the properties of the particular sphere-forming material used, the particular metal and the amount of it encapsulated and the temperatures to which the unblown particles are exposed.

While the use of zinc as the material being encapsulated has been discussed above, other materials may also be employed. These include, for example, magnesium, sodium, cesium and lead. Also certain metallic alloys such as Wood's metal can also be employed. Where a contiguous internal coating is not desired, the techniques of the instant invention can also be practiced using nonmetallic filler materials such as water, air and freon. Polymers could be used as encapsulating materials.

The following specific example is set forth for a further understanding of the invention. This example is intended to be for illustrative purposes and is not to be understood as limiting the scope of the instant invention in any way.

EXAMPLE

Commercially available alumina silicate glass having a specific gravity of 2.53 is used as the encapsulating material and zinc metal is used as the material to be encapsulated. By using the technique described in U.S. Pat. No. 3,310,612, microparticles having an overall diameter of about 247 microns and containing a zinc core of about 90 microns in diameter are produced. These particles are then heated to slightly above the softening point of the glass, $\approx 1,000°$ C. in a stream of hot air at atmospheric pressure over a period of time in the range of from about 50 to about 500 seconds. Under these conditions the zinc is vaporized and "blows" the softened glass into a spherical balloon having an outside diameter in the range of about 2,000 microns and a wall thickness of about 5 microns. The blown spheres are then quenched in a stream of air at a temperature of 80° F. for 100 seconds. The quenching causes the glass walls to harden and causes the zinc vapor to condense in their interior surfaces. The condensed metallic lining so produced is from about 300 to about 1500 angstroms thick, depending on the the pressure in the expansion chamber. The density of the spheres so produced is about 2.15 lbs./ft.$^3$ and the individual spheres have a mass on the order of $3.21 \times 10^{17}$ lbs./particle.

While the above example indicates that particles having blown diameters in the range of about 2,000 microns are produced, it will be appreciated by those skilled in the art that particles having different diameters can be readily produced using the techniques of the instant invention. The external diameters of the spheres could range from about 50 to about 2,000 microns.

In a preferred embodiment the largest particle deemed useful as an insulation media is that when placed in a 1/2-inch or 1-inch space would give a sufficient number of radiation barriers to attenuate the thermal radiation. A 2-millimeter sphere would result in approximately 12 radiation barriers per inch, and this number is deemed useful in providing a good insulation media. It will also be appreciated that it is desirable to produce microspheres having a range of sizes.

The primary reason for having more than a single size is to permit a higher packing density of spheres. From this point of view the size distribution ranging from 0.05 to 2 millimeters gives a packing density in excess of 80 percent and accordingly is a preferred range.

It is to be appreciated that the invention in its broader aspects is not limited to the specific details shown and described in the foregoing examples and obviously departures may be made from such details without departing from the principles of the invention and without sacrificing its chief advantages.

As heretofore indicated, the microspheres produced by the process of the instant invention are particularly suited for use in obtaining a superior insulation material. In this vein a multiplicity of individual spheres may be bonded together by the use of a suitable adhesive or by other methods, such as heat sealing, to form a high-performance multiradiation barrier, load-bearing insulation system which is of a quality comparable with the better insulation materials now available, such as foamed plastics. In addition to processing superlative insulating properties, the instant insulation material is capable of withstanding relatively high compressive loads with must less degradation in performance than is experienced with foamed plastic insulation.

When in a vacuum environment the superior insulating properties referred to above result from the multiradiation barrier structure of the individual spheres and the thermal contact resistance between the spheres. When in a nonevacuated environment, the superior insulation properties result from the vacuum inside the spheres and the low conduction path along the thin wall of the sphere.

Having thus described and illustrated by way of example the instant invention, what is claimed is:

1. A method for the production of an internally coated evacuated glass sphere having an external diameter in the range of 50 to 2,000 microns which comprises:
   a. centrifugally encapsulating a filler material in glass to produce an encapsulated particle by passing said filler material through a first passageway in a rotating member concurrently with molten glass in a second passageway in said rotating member, both the filler material and the glass moving outwardly in a radial direction by centrifugal force, said glass covering said filling material at the outer extremity of the rotating member and thereafter being expelled from said rotating member, said filler material being characterized by having a boiling point lower than the softening temperature of said glass, and being selected from the group consisting of zinc, magnesium, sodium, cesium, and silver;
   b. increasing the temperature of the particle obtained in step until the filler material is vaporized, thereby causing an increased pressure in said particle;
   c. further increasing the temperature of said particle to a temperature at which the glass is softened, whereby it expands under the influence of said pressure to produce a hollow sphere; and thereafter
   d. quenching the hollow sphere produced in step whereby the glass becomes rigid and said filler material condenses on the now rigid glass to form an internal coating on the wall of said hollow sphere.

2. The method of claim 1, wherein the particles produced in step have an overall diameter of about 247 microns and contain a zinc core of about 90 microns.

3. The method of claim 2 wherein the particles produced in step have an outside diameter in the range of about 2,000 microns, a wall thickness of about 5 microns and wherein said internal coating is in the range of from about 300 to about 1500 angstroms thick.